United States Patent [19]

Jenkner

[11] 4,348,924
[45] Sep. 14, 1982

[54] METHOD AND APPARATUS FOR TRIMMING LAMINATES

[76] Inventor: Erwin Jenkner, Lindenstrasse 13, D-7261 Gechingen, Fed. Rep. of Germany

[21] Appl. No.: 179,688

[22] Filed: Aug. 20, 1980

[30] Foreign Application Priority Data

Apr. 14, 1980 [CH] Switzerland ............... 2845/80

[51] Int. Cl.³ ........................................... B27B 5/00
[52] U.S. Cl. ........................................... 83/39; 83/56; 83/71; 83/277; 83/412; 83/415; 269/56; 269/315; 414/751
[58] Field of Search ............... 414/751, 753; 269/56, 269/156, 315; 83/29, 39, 71, 206, 277, 409, 415, 412, 413, 414, 367, 453, 465, 467, 471.2, 36, 56

[56] References Cited

U.S. PATENT DOCUMENTS

| | | | |
|---|---|---|---|
| 2,610,661 | 9/1952 | Romine | 269/156 |
| 2,789,595 | 4/1957 | Peterson | 83/412 |
| 3,033,067 | 5/1962 | Thumim | 83/206 |
| 3,691,887 | 9/1972 | Roch | 83/460 X |
| 4,234,176 | 11/1980 | Goff | 269/136 |
| 4,297,927 | 11/1981 | Kuroda | 83/412 X |

*Primary Examiner*—James M. Meister
*Attorney, Agent, or Firm*—Kontler, Grimes & Battersby

[57] ABSTRACT

A laminated plate-like workpiece of the type wherein the outer layers extend laterally beyond the edge faces of a median layer is trimmed in an apparatus wherein a reciprocable carriage supports several elongated abutment members which can enter between the outer layers of a workpiece to move into contact with an edge face of the concealed median layer. The workpiece is thereupon coupled to the carriage by several pairs of jaws and the carriage is moved to one or more preselected positions in each of which a different portion of the workpiece is located in the cutting plane of a rotary circular saw.

9 Claims, 2 Drawing Figures

METHOD AND APPARATUS FOR TRIMMING LAMINATES

BACKGROUND OF THE INVENTION

The present invention relates to a method and apparatus for treating or manipulating plate-like workpieces, and more particularly to improvements in a method and apparatus for trimming plate-like bodies which consist of or comprise two or more overlapping layers or strata. Typical examples of such workpieces are laminates wherein a centrally located layer of wood is flanked by outer layers consisting of wood or synthethic plastic material.

Trimming of laminated workpieces presents no serious problems as long as each of the layers is readily accessible so that the workpiece can be properly positioned with reference to one or more rotary circular saws and/or other suitable trimming or severing instrumentalities. However, when one or both outer layers project laterally beyond the layer or layers therebetween and the position of a median layer is controlling for a satisfactory trimming operation, presently known trimming apparatus are incapable of ensuring adequate and reproducible positioning of each of a series of raw (untrimmed) workpieces with respect to the cutting tool or tools. Accurate trimming is often desirable and/or necessary, for example, when the finished workpieces are to be used as component parts of fine furniture or the like. On the other hand, the configuration of laminated workpieces which issue from a press wherein the neighboring layers are bonded to each other in response to the application of heat, pressure and/or adhesive is often highly irregular, and it happens again and again that the outer layers extend well beyond the layer or layers therebetween. In many instances, the median layer or layers are fully concealed by both outer layers so that the edge face or faces of the median layer or layers are neither visible nor readily accessible. As a rule, the workpieces are trimmed in apparatus which employ a rotary circular saw and a feeding means which can engage a freshly admitted workpiece and moves the workpiece between several positions in accordance with a preselected program. Apparatus of the just outlined character can further comprise a pressure applying beam for the workpiece (or a stack of workpieces) and means for driving the circular saw as well as for moving the saw so that the axis of the saw is located at a level below the feeding means. Reference may be had to the commonly owned copending patent application Ser. No. 115,880 filed Jan. 28, 1980, now abandoned. Such automatic apparatus cannot be used for rapid trimming of a short or long series of workpieces wherein the median layer or layers are not readily accessible if the marginal portions or edge faces of the median layer or layers are to be used as reference points for initial positioning of a workpiece before the programming unit for the work feeding means takes over and moves the workpiece to one or more preselected positions with reference to the trimming plane.

OBJECTS AND SUMMARY OF THE INVENTION

An object of the invention is to provide a novel and improved apparatus for trimming plate-like laminated workpieces wherein at least one layer is not readily accessible but is needed for accurate positioning of the workpiece prior to and/or in the course of one or more trimming operations.

Another object of the invention is to provide novel and improved work gripping, locating and feeding means in an apparatus of the above outlined character.

A further object of the invention is to provide an apparatus which can readily ascertain the position of a given layer which forms part of a laminated plate-like workpiece and whose marginal portions are at least partly confined between and overlapped by one or more laterally protruding outer layers.

An additional object of the invention is to provide a novel and improved method of positioning laminated workpieces prior to as well as or in the course of a trimming operation.

Another object of the invention is to provide a method which renders it possible to properly locate a laminated workpiece by relying on the position and/or dimensions of one or more layers or layer portions which are neither visible nor readily accessible.

One feature of the invention resides in the provision of a method of manipulating a laminated plate-like workpiece having at least two layers one of which extends laterally beyond an edge face of the other layer. For example, the other layer may constitute a panel which is made of wood and is partly or fully concealed between two outer layers which consist of wood, synthetic plastic material or a combination of several dissimilar material. The method comprises the steps of moving the edge face of the other layer in contact with a mobile reference surface (e.g., with the surface at the tip of an elongated abutment member which is fixedly, adjustably and/or removably secured to a reciprocable carriage), coupling the workpiece to the reference surface (e.g., by resorting to one or more pairs of jaws which separably secure the workpiece to the aforementioned carriage) while the reference surface continues to remain in contact with the edge face of the other layer, and moving the reference surface together with the workpiece to at least one predetermined position. The method may further comprise the step of severing (e.g., trimming) the workpiece in a predetermined plane while the workpiece and the reference surface dwell in the predetermined position. The severing step can be carried out by resorting to a rotary circular saw which is rotatable as well as reciprocable in the predetermined plane.

Still further, the method may comprise the steps of shifting the workpiece and the reference surface to a second predetermined position upon completion of the severing step to thereby place a preselected portion of the once-severed workpiece into the aforementioned predetermined plane, and severing the preselected portion of the workpiece in such predetermined plane. The just discussed method can further comprise the steps of disengaging the reference surface from the workpiece upon completion of the shifting step, transporting the thus disengaged reference surface away from the edge face of the other layer of the workpiece, and holding the workpiece against movement in the course of the disengaging and transporting steps as well as in the course of the second severing step.

The apparatus which embodies the present invention comprises work feeding means having a mobile carriage (e.g., a carriage which is reciprocable by a servomotor in response to signals from a suitable programming unit), at least one abutment member extending from the carriage and having a reference surface movable into contact with the edge face of the other layer of the workpiece, and gripping means (e.g., one or more pairs of jaws which are movable between open and closed positions) which is actuatable to releasably couple the workpiece to the carriage while the reference surface of the abutment member continues to contact the edge face of the other layer. The aforementioned servomotor or an analogous moving means thereupon moves the carriage to at least one predetermined position while the gripping means couples the workpiece to the carriage. A rotary circular saw or other suitable means can be provided to sever the workpiece in a predetermined plane while the carriage dwells in the predetermined position.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
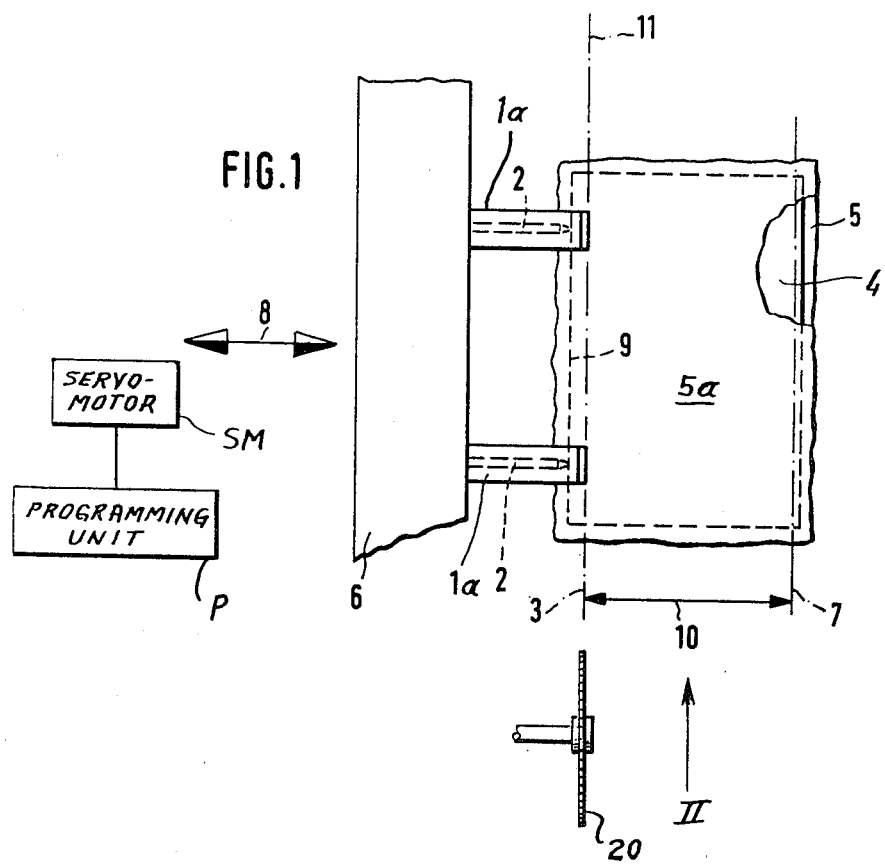
FIG. 1 is a schematic plan view of an apparatus which embodies one form of the invention and of a workpiece which is about to be trimmed by a rotary circular saw.
Figure 2:
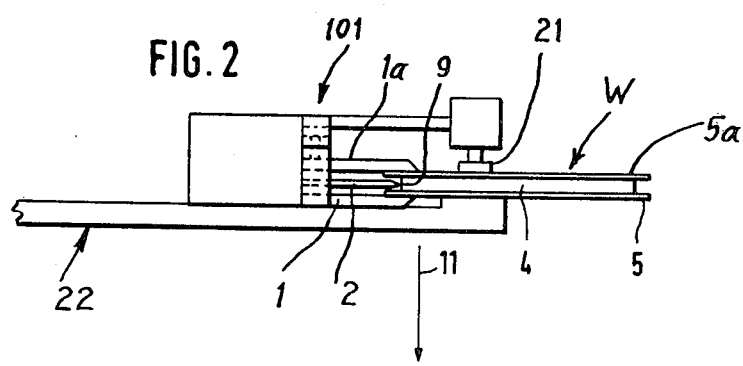
FIG. 2 is a side elevational view of the apparatus as seen in the direction of arrow II in FIG. 1.

The apparatus which is shown in FIGS. 1 and 2 comprises a feeding unit which serves to move a workpiece W back and forth in the directions indicated by a double-headed arrow 8. The feeding unit includes a reciprocable carriage 6 which is provided with two or more sets of coupling or gripping means including jaws 1, 1a and an abutment member 2 between each pair of jaws. The purpose of the abutment members 2 is to contact and thus position the edge face 9 of the intermediate layer or stratum 4 of the workpiece W. The latter further comprises two outer strata or layers 5 and 5a which are respectively disposed below and above the median layer 4 when the workpiece W (e.g., a laminate including a centrally located panel made of wood and two outer layers consisting of synthetic plastic material, plywood or the like) is held in substantially horizontal position as shown in FIG. 2. The carriage 6 is provided with suitable motors 101 (e.g., hydraulic or pneumatic double-acting cylinder and piston units) which can move the respective upper jaws 1a toward and away from the associated lower jaws 1 whereby that marginal portion of the workpiece W which has been inserted between the jaws 1, 1a of the illustrated pairs is coupled to and shares all movements of the carriage 6. The latter is reciprocable by a servomotor SM of any known design which, in turn, receives signals from a programming unit P. The exact construction of the programming unit P forms no part of the present invention. All that counts is to ensure that the programming unit P can actuate the servomotor SM so that the latter moves the carriage 6 through a preselected distance, either in a direction to the right or in a direction to the left, as viewed in FIG. 1 or 2.

The apparatus further comprises a circular saw 20 which is located in a vertical plane and can be moved up or down, as viewed in FIG. 1, so as to sever or trim the workpiece W while the latter is held by the pairs of jaws 1, 1a or by suitable holding means (such as those indicated by the reference character 21 and mounted on the frame 22 of the machine which embodies the saw 20, the feeding unit including the carriage 6 with its jaws 1, 1a and abutment members 2, the servomotor SM and the programming unit 9). The programming unit P is preferably an electronic programmer of any suitable design which is readily available on the market.

The operation of the just described apparatus is as follows:

The saw 20 is idle and is located at one side of the workpiece W (i.e., above or below the workpiece, as viewed in FIG. 1). The workpiece W is inserted into the apparatus in such a way that the edge face 9 of its median layer 4 contacts the reference surfaces at the tips of the abutment members 2 while the carriage 6 maintains the two pairs of jaws 1, 1a in the positions shown in FIG. 1. The jaws 1a are remote from the respective jaws 1 during insertion of the workpiece W therebetween. The motors 101 are then actuated to move the upper jaws 1a against the upper side of the outer layer 5a whereby the lower layer 5 bears against the jaws 1. This ensures that the workpiece W is properly coupled to and can share the movements of the carriage 6. The servomotor SM receives a signal from the programming unit P (e.g., in response to closing of the jaws 1a) which causes the servomotor SM to move the carriage 6, and hence the workpiece W, in a direction to the left through a preselected distance 10. This places a predetermined portion (see the vertical plane which is denoted by the phantom line 7) of the workpiece into the cutting plane 11 of the saw 20. In other words, the saw 20 is ready to sever the workpiece W (in the plane 11 which then coincides with the plane 7) in such a way that the cut is located at the distance 10 from the edge face 9 of the median layer 4. The programming unit P then starts a motor (not shown) which rotates the saw 20 and a device (not shown) which moves the saw 20 upwardly or downwardly, as viewed in FIG. 1, so that the saw cuts the workpiece in the plane 11.

When the severing of the workpiece W in the plane 11 is completed, the programming unit P transmits a signal which causes the servomotor SM to move the carriage 6 in a direction to the right, as viewed in FIG. 1 or 2, so that the workpiece portion which is denoted by a phantom line 3 coincides with the cutting plane 11 (as shown in FIG. 1). The motors 101 are actuated to move the jaws 1a upwardly and to thus disengage the feeding unit from the partially trimmed workpiece W. The latter is then engaged by the holding means 21 (e.g., in a manner as disclosed in the aforementioned commonly owned copending application Ser. No. 115,880 to which reference may be had, if necessary) so that it is properly secured to the frame 22 in spite of the fact that the jaws 1, 1a are open. The saw 20 is thereupon again caused to move up or down, as viewed in FIG. 1, and to trim the left-hand portion of the workpiece W by removing the surplus which extends to the left and beyond the coinciding planes 3, 11. It will be noted that, once the edge face 9 of the median layer 4 contacts the reference surfaces of the abutment members 2 on the carriage 6, the latter moves first to the left so as to ensure that the surplus at the right-hand side of the workpiece W is removed by the saw 20, and the carriage 6 thereupon moves in a direction to the right, through the distance 10, before the jaws 1, 1a are opened and the carriage 6 is retracted to the left in order to allow for unimpeded movement of the saw 20 across the workpiece W while the plane 3 coincides with the cutting plane 11. This completes the trimming of two sides of the workpiece W, and the apparatus is ready to treat the next workpiece. When the treatment of each of a series of workpieces in a batch is completed in the just described manner, the programming unit P is reset to select a different distance (i.e., a distance which is different from that shown at 10) before the partially (twice) trimmed workpieces are reintroduced into the apparatus in order to trim the remaining two marginal portions, provided, of course, that the manufacturer wishes to convert each workpiece into a rectangular or square laminate having a predetermined length and width.

The holding means 21 opens when the trimming of the left-hand portion of the workpiece W is completed, so that the workpiece can be readily removed from the apparatus. Signals for opening or closing of the holding means 21 can be furnished by the programming unit P in automatic response to completion of the second severing action, i.e., after the saw 20 has moved across the workpiece W while the plane 3 was held in a position of coincidence with the cutting plane 11.

It is clear that the improved apparatus can be used with equal advantage for severing and trimming of laminates which comprise only two layers and wherein the layer or stratum whose edge face is to be moved into contact with the reference surfaces of the abutment members 2 is not readily accessible because the other layer extends laterally and beyond the first mentioned layer.

If desired, the programming unit P can be simplified in that it merely comprises two steps one of which arrests the carriage 6 when the right-hand marginal portion of the workpieces W extends to the right of and beyond the cutting plane 11, and the other of which arrests the carriage 6 when the plane 3 coincides with the plane 11. The signals which are needed to actuate the servomotor SM, the motor which rotates the saw 20, the motor which moves the saw 20 in the plane 11, the motors 101 and the motor means for the holding means 21 are then generated by hand or by a suitable control unit which need not transmit signals to the servomotor SM or transmits to this servomotor only start and stop signals.

An important advantage of the improved apparatus is that it constitutes a relatively simple and inexpensive but unobvious modification of heretofore known apparatus for trimming and/or otherwise manipulating plate-like workpieces. Thus, all that is necessary is to equip the carriage 6 with one or more fixedly, adjustably or separably mounted abutment members 2 which have reference surfaces movable into contact with the concealed edge face 9 of the layer 4. The abutment members 2 may but need not be located between the jaws 1, 1a as long as they can penetrate between those marginal portions of the outer layers 5, 5a of the workpiece W which extend laterally beyond the edge face 9 before the jaws 1, 1a close to grip the outer sides of the layers 5, 5a and to thus couple the workpiece W to the reference surfaces of the members 2. The abutment members 2 can be said to constitute component parts of an attachment which can be affixed to the carriage 6 to thereby ensure that the apparatus including the carriage 6 can be used to trim and/or otherwise treat or manipulate laminated workpieces wherein one or both outer layers extend laterally beyond one or more median layers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for trimming laminated workpieces of the type having at least two layers, one of which extends laterally beyond an edge face of the other layer, comprising a mobile carriage; at least one abutment member extending from said carriage and movable into contact with the edge face of the other layer of a workpiece; and gripping means actuatable to releasably couple the workpiece to said carriage while said abutment member contacts the edge face of the other layer of such workpiece, wherein said gripping means comprises a pair of jaws, at least one of which being movable toward and away from the other of said jaws and wherein said abutment member is disposed between and spaced apart from said jaws.

2. The apparatus of claim 1, further comprising means for moving said carriage to at least one predetermined position while said gripping means couples the carriage to a workpiece, and means for trimming the thus coupled and gripped workpiece while the carriage dwells in said predetermined position.

3. The apparatus of claim 1, further comprising means for reciprocating said carriage along a predetermined path between a plurality of predetermined positions.

4. The apparatus of claim 3, wherein said reciprocating means includes motor means and means for operating said motor means in accordance with a preselected program.

5. The apparatus of claim 1, wherein said abutment member is fixedly secured to said carriage.

6. A method of manipulating a laminated workpiece of the type having at least two layers, one of which extends laterally beyond an edge face of the other layer, comprising the steps of moving the edge face of the other layer in contact with a mobile reference surface disposed between and spaced apart from a pair of jaws; moving at least one of said jaws to couple the workpiece to the reference surface while the latter continues to remain in contact with the edge face of the other layer; and moving the reference surface and the workpiece to at least one predetermined position.

7. The method of claim 6, further comprising the step of severing the workpiece in a predetermined plane while the workpiece and the reference surface dwell in said predetermined position.

8. The method of claim 7, further comprising the steps of shifting the workpiece and the reference surface to a second predetermined position upon completion of said severing step so that a preselected portion of the once-severed workpiece is located in said predetermined plane, and severing said preselected portion of the workpiece in said predetermined plane.

9. The method of claim 8, further comprising the steps of disengaging the reference surface from the workpiece upon completion of said shifting step, transporting the thus disengaged reference surface away from the edge face of the other layer of the workpiece, and holding the workpiece against movement in the course of said disengaging, transporting and last mentioned severing steps.

* * * * *